United States Patent
Shepherd

(10) Patent No.: US 6,513,552 B1
(45) Date of Patent: Feb. 4, 2003

(54) MULTI-FLEX STAINLESS STEEL ROOF DRAIN HOSE

(75) Inventor: Gerald D. Shepherd, Tulsa, OK (US)

(73) Assignee: General Machinery of Pittsburgh, Inc., Pittsburgh, KS (US)

(*) Notice: Subject to any disclaimer, the term of this patent is extended or adjusted under 35 U.S.C. 154(b) by 0 days.

(21) Appl. No.: 09/965,321

(22) Filed: Sep. 28, 2001

(51) Int. Cl.⁷ .................................................. F16L 9/17
(52) U.S. Cl. ...................... 138/109; 138/131; 138/134; 138/135; 138/143; 138/144
(58) Field of Search .................... 138/109, 131, 138/134, 135, 139, 143, 144

(56) References Cited

U.S. PATENT DOCUMENTS

| | | | | | |
|---|---|---|---|---|---|
| 1,315,784 A | * | 9/1919 | Levitt | ............... | 138/139 |
| 1,676,036 A | * | 7/1928 | Levitt | ............... | 138/134 |
| 1,809,874 A | * | 6/1931 | Stone | ............... | 138/135 |
| 1,995,407 A | * | 3/1935 | Walker | ............... | 138/135 |
| 2,420,153 A | * | 5/1947 | Sprenger et al. | ............... | 138/135 |
| 3,623,513 A | * | 11/1971 | Dinkelkamp | ............... | 138/135 |
| 4,998,597 A | * | 3/1991 | Bainbridge et al. | ......... | 138/109 |
| 5,638,869 A | * | 6/1997 | Zaborszki et al. | ......... | 138/109 |
| 5,803,128 A | * | 9/1998 | Reed | ............... | 138/109 |
| 6,016,842 A | * | 1/2000 | Rooke | ............... | 138/109 |
| 6,279,614 B1 | | 8/2001 | Riesselmann | | |

* cited by examiner

Primary Examiner—James Hook
(74) Attorney, Agent, or Firm—William S. Dorman

(57) ABSTRACT

A drain hose that connects to the movable roof of a petroleum storage tank. The hose extends downwardly through the material stored in the tank and to a discharge at the lower portion of the tank. The hose is comprised of (a) an inner stainless steel tube(or hose) having a stainless steel overbraid and (b) a spirally wound outer tube (or hose) also of stainless steel. The inner hose is connected to flanges that have ferrules extending therefrom. The outer protective hose is captured in a free floating manner by the ferrules such that the outer hose is allowed to move along or slide over the inner hose without escaping the end ferrules.

4 Claims, 2 Drawing Sheets

MULTI-FLEX STAINLESS STEEL ROOF DRAIN HOSE

BACKGROUND OF THE INVENTION

1. Field of the Invention

The present invention relates to a storage tank for petroleum products, particularly a storage tank having a floating roof which is adapted to move above the petroleum product (hydrocarbons} stored in the tank and to lie in close proximity to the upper surface of the petroleum product. More particularly, the present invention relates to a stainless steel roof drain hose which is connected to the center of the floating roof and which passes downwardly into the bottom of the tank and discharges water at an outlet at the bottom side of the tank.

2. Prior Art

It is well known to attach a hose at the lower center of the floating roof and to direct the hose downwardly to the bottom of the tank, generally forming a loop at the bottom and then proceeding out to a drain opening at the bottom of the tank. The drain hose must be resistant to the hydrocarbons which are stored in the tanks. Some of the prior art hoses are made from rubber or plastic and some are made from stainless steel; still others are compound hoses where one hose is inside of another hose, one of which hoses can be stainless steel and the other of which hoses can be plastic or rubber.

It is extremely important that the rainwater be drained from the floating roof. Otherwise, the weight of the rainwater on the roof could cause the roof to sink into the petroleum product. If this should occur, the retrieval of a sunken roof is extremely difficult and generally quite costly, not to mention that the tank will suffer some down time while the roof is moved to its proper position.

It is a worthwhile consideration that the drain hose be inexpensive, in which case there is a tendency for the drain hose to be somewhat light in weight. On the other hand, if the drain hose is too light it has a tendency to be buoyed up in the petroleum product above the bottom of the tank, thus interfering with the free discharge of the rain water through the hose. Some hoses, therefore, are provided with outer covers to serve as ballast.

SUMMARY OF THE INVENTION

The present invention relates to a drain hose that connects to the movable roof of a petroleum storage tank. The hose extends downwardly through the material stored in the tank and to a discharge at the lower portion of the tank. The hose is comprised of (a) an inner stainless steel tube (or hose) having a stainless steel over-braid and (b) a spirally wound outer tube (or hose) also of stainless steel. The inner hose is connected to flanges that have ferrules extending therefrom. The outer protective hose is captured in a free floating manner by the ferrules such that the outer hose is allowed to move along or slide over the inner hose without escaping the end ferrules. Because the outer hose is free to move in the manner described above, the composite hose may flex, bend, stretch or contract without any consequent damage to any part of the hose; hence the term "multi-flex."

DETAILED DESCRIPTION OF THE PREFERRED EMBODIMENTS

Figure 1:
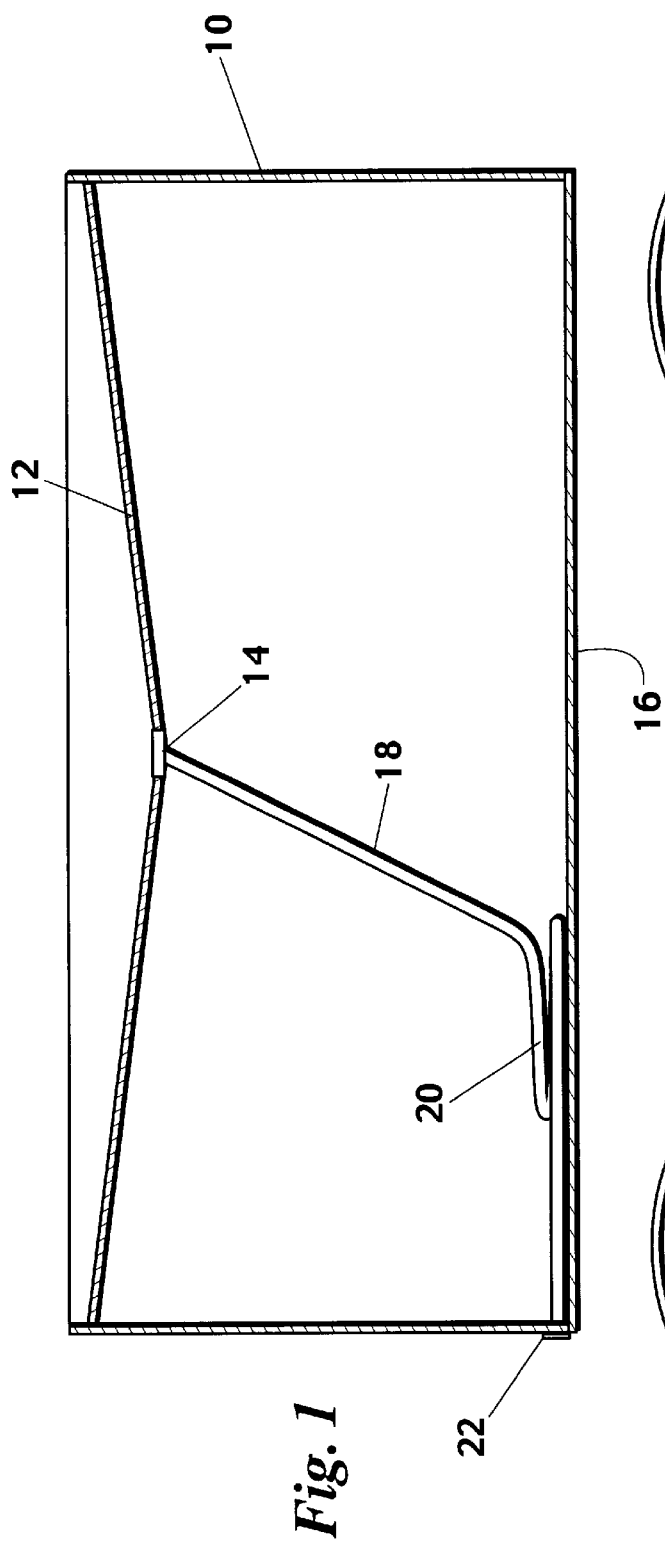
FIG. 1 is a diagrammatic side view through a tank of the type to which the present invention applies showing a hose connected to the center of a floating roof, the hose passing downwardly through a loop and then outwardly on the floor of the tank to a discharge opening at the side of the tank.
Figure 3:
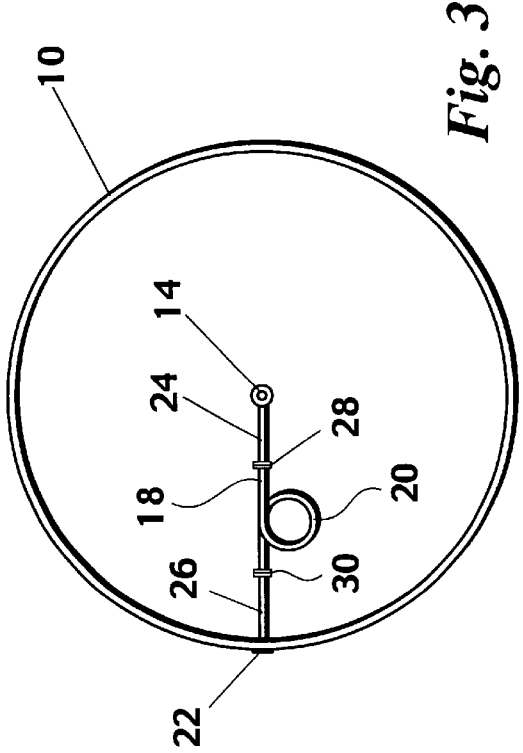
FIG. 3 is a view similar to FIG. 2 showing the drain hose connected from a pipe which extends from the center of the floating roof to a second pipe which extends along the floor of the tank to the discharge opening.
Figure 2:
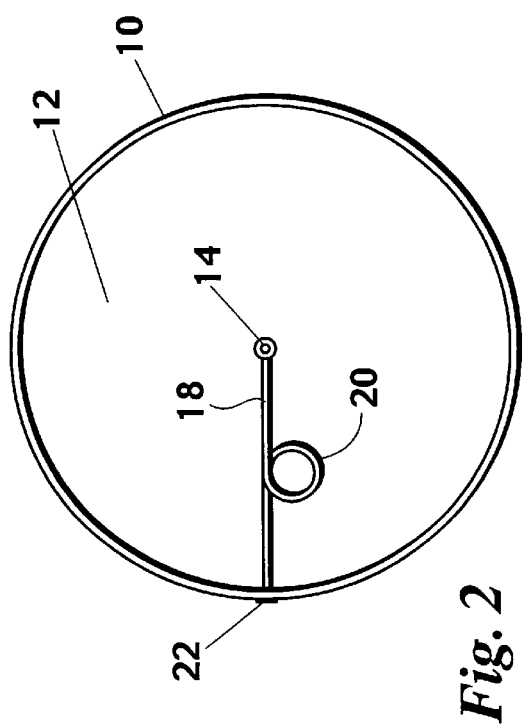
FIG. 2 is a diagrammatic plan view of one type of connection of the hose from the drain at the center of the roof extending outwardly to a drain discharge at the side of the tank.

Referring to the drawings in detail, FIGS. 1, 2 and 3 show a large cylindrical tank 10 in which petroleum product is stored. This petroleum product can be corrosive or non-corrosive and it can viscous or non-viscous. In any event, the tank 10 in is the form of a cylinder which could be as large as 125 feet in diameter and which could be 40 feet high. FIG. 1 shows a roof 12 which is inclined towards the center where there is located a drain opening 14. The tank 10 includes a bottom 16. Preferable, the roof 12 is allowed to float on the surface of the hydrocarbon material stored in the tank 10 although there may be a small space between the top of the petroleum product and the roof, which will be filled with a vapor.

For the purpose of removing rain water from the roof 12, a hose 18 extends downwardly from the drain 14 to the floor 16 of the tank where it generally forms a loop 20 after which it extends radially outward to a drain opening 22 in the lower outer side of the tank 10.

In the sketch of FIG. 2, the hose 18 extends from the opening 14 at the lower center of the roof 12 to the outlet drain 22 at the outer lower side of the tank 10 level with the bottom 16.

In some instances, it is deemed desirable to connect a pipe to the drain in the roof and a second pipe along the bottom 16 of the tank 10 and then to connect the hose between the two pipes. FIG. 3 represents such an arrangement. In FIG. 3, which is purely diagrammatical, a piece of pipe 24, preferably of stainless steel, extends from the drain opening 14 downwardly into the interior of the tank. A second pipe 26 extends preferably along the floor of the tank radially inwardly from the outer drain 22. The hose 18, which also is provided with a loop 20, connects to the pipe 24 through a flange connection 28 and to the pipe 26 through a flange connection 30.

Figure 4:
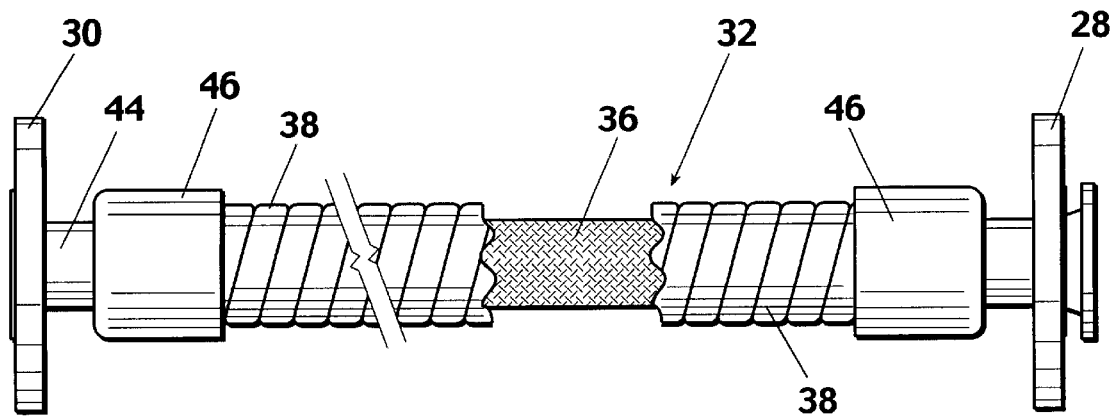
FIG. 4 is a semi-diagrammatic side elevation, with parts broken away to indicate length, of a composite hose which is constructed in accordance with the present invention.

Turning now to FIG. 4, this illustration is a semi-diagrammatical representation of a composite hose 32 (the same as hose 18 in FIGS. 1, 2 and 3) which is the subject of the present invention. Hose 32 is comprised of an inner (hose) stainless steel inner tube 34 (see now FIG. 5) with a stainless over-braid 36. The inner tube 34 is spun into an outer cover 38 (outer hose) of stainless steel. The outer hose protects the inner hose and it also serves as a ballast.

Figure 5:
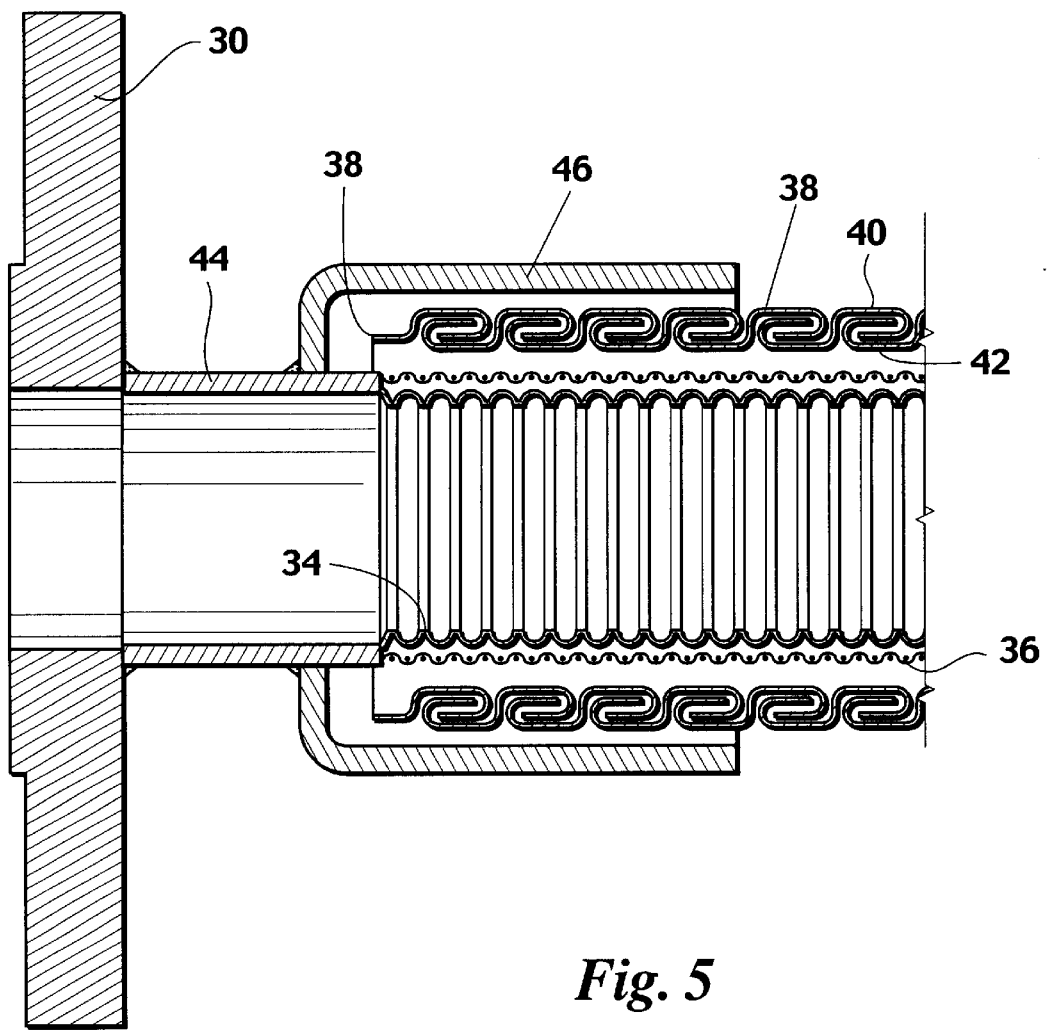
FIG. 5 is an enlarged sectional view of the left hand portion of FIG. 4 showing details of the two hoses which make up the composite hose of the present invention and the manner in which they are connected or not connected to the ferrule which connects to the flange at each end of the hose.

As best shown in FIG. 5 the outer hose 38 is a helically wound stainless steel member formed from overlapping (and interlocking) pieces of steel 40 and 42. As shown in FIGS. 4 and 5, the composite hose is provided with flanges 28 and 30. Flange 30, for example, connects with a cylindrical stainless steel coupler 44, which in turn is welded to a stainless steel ferrule 46. The ferrule is a cup-shaped member which is welded to the coupler 44 adjacent the right hand end of the latter. The ferrule 46 connects to the coupler by means of a vertical wall which constitutes the distal end of the ferrule. The open end of the ferrule extends over thhoses as shown.

As best show in FIG. 5, the right hand end of the cylindrical coupler 44 is welded to the inner stainless steel tube 34 and to its over-braid 36. However, the stainless steel coupler 44 is not welded to the end of the outer stainless steel tube 38, nor is the ferrule 46. As a result, the outer stainless steel (hose) tube 38 is free to expand or slide over the inner stainless steel tube and the outer hose is free to move in either direction. If the outer hose were fixed to the flanges or the ferrules, bending of the combined hose could cause the overlapping portions of the outer hose to be bent, thereby, causing a premature failure. Purely for the purposes of explanation, and not by way of limitation, the composite hose 18 has a minimum inner diameter of three inches and the ferrule 46 extends from the coupler 44 and away from the flange 30 for a minimum distance of approximately four inches. The ends of the inner hose 34 and its over-braid 36 are welded directly to the end of the coupler 44 as best shown in FIG. 5, but the end of the outer hose 38 is not welded to the coupler or to the ferrule.

The left-hand end of the outer hose 38 is freely received in the annular space between the inner hose 34 and the (cup-shaped) ferrule 46. The right hand end of the outer hose 38 (see now FIG. 4) is similarly received in the ferrule 46 associated with the right flange 28. The details of this arrangement would be the same as those shown at the left-hand end of the hoses 34 and 38 as in FIG. 5 and, hence, will not be repeated herein. The left-hand end of the outer hose 38 (as would also be the case with the right-hand end) is spaced from the vertical wall of the ferrule a minimum of ½ inch to permit relative sliding movement of the outer hose over the inner hose as the composite hose flexes; i.e. bends, stretches or contracts.

Whereas the present invention has been described in particular relation to the above disclosure, including the drawings, other and further modifications, apart from those shown or suggested herein may be made within the spirit and scope of this invention.

What is claimed is:

1. A composite stainless steel hose having one end adapted to be connected to a movable roof of a petroleum storage tank and having an opposite end adapted to be connected to a discharge at a lower portion of the tank for removing rain water from the roof, the composite hose having a flange at each end thereof, each flange having a ferrule attached thereto and extending over the end of the hose associated therewith, the composite hose being comprised of an inner stainless steel hose and an outer stainless steel hose, the ends of the inner hose being connected to the flanges such that the ferrules extend over the ends of the inner hose forming an annular space at each end between the ferrule and the end of the inner hose, each end of the outer hose being freely received in the annular space at each end and being unconnected to the ferrule so as to provide sliding movement between the inner hose and the outer hose whenever the composite hose flexes.

2. A composite stainless steel hose as set forth in claim 1 wherein the inner hose consists of a stainless steel tube having a stainless steel over-braid.

3. A composite stainless steel hose as set forth in claim 1 wherein the outer hose consists of a spirally wound stainless steel outer tube.

4. A composite stainless steel hose as set forth in claim 1 wherein each ferrule is attached to an associated flange by means of a cylindrical stainless coupler, the ferrule being cup-shaped and connecting to the coupler by means of a vertical wall constituting a distal end of the ferrule, the end of the inner hose being connected to the flange by welding the same to an end of the coupler, the end of the outer hose being spaced from the vertical wall.

\* \* \* \* \*